United States Patent
Wood et al.

(10) Patent No.: US 8,574,712 B2
(45) Date of Patent: Nov. 5, 2013

(54) HIGH SOLAR REFLECTIVITY, COLORED MULTI-LAYERED COMPOSITION

(75) Inventors: Kurt A. Wood, Abington, PA (US); Jerrold K. Petersheim, Morgantown, PA (US)

(73) Assignee: Arkema Inc., King of Prussia, PA (US)

( * ) Notice: Subject to any disclaimer, the term of this patent is extended or adjusted under 35 U.S.C. 154(b) by 16 days.

(21) Appl. No.: 12/738,399

(22) PCT Filed: Oct. 3, 2008

(86) PCT No.: PCT/US2008/078656
§ 371 (c)(1),
(2), (4) Date: Apr. 16, 2010

(87) PCT Pub. No.: WO2009/051973
PCT Pub. Date: Apr. 23, 2009

(65) Prior Publication Data
US 2010/0233461 A1  Sep. 16, 2010

Related U.S. Application Data

(60) Provisional application No. 60/980,859, filed on Oct. 18, 2007.

(51) Int. Cl.
*G11B 11/105* (2006.01)
(52) U.S. Cl.
USPC ........................................ 428/332; 428/335
(58) Field of Classification Search
USPC ...................................................... 428/332
See application file for complete search history.

(56) References Cited

U.S. PATENT DOCUMENTS

| 7,399,533 | B2 | 7/2008 | Zheng et al. |
| 7,803,867 | B2 * | 9/2010 | Hanrahan et al. ............. 524/544 |
| 2003/0030041 | A1 | 2/2003 | Genjima et al. |
| 2005/0142329 | A1 | 6/2005 | Anderson et al. |
| 2005/0252137 | A1 * | 11/2005 | Bartek et al. .................... 52/518 |
| 2006/0154049 | A1 | 7/2006 | Padiyath et al. |
| 2008/0095984 | A1 | 4/2008 | Desouto |

FOREIGN PATENT DOCUMENTS

| JP | 07308633 A | * 11/1995 | ............... B05D 7/14 |
| JP | 20011157870 A | 6/2001 | |
| JP | 2005034766 A | * 2/2005 | ............... B05D 5/00 |
| WO | WO 2007/078201 A1 | 7/2007 | |

OTHER PUBLICATIONS

R. Levinson, et al., Methods of creating solar-reflective nonwhite surfaces and their application to residential roofing materials, Solar Energy Materials & Solar Cells (2006), doi:10.1016/j.solmat.2006.06.062.*
Levinson et al.—"Methods of creating solar-reflective nonwhite surfaces and their application to residential roofing materials", Solar Energy Materials & Solar Cells, 91 (2007), p. 304-314.
Wood, K. and Zheng, M., "Hot Solutions for Cool Roofs". Finishing Today, Feb. 1, 2007.

* cited by examiner

*Primary Examiner* — Barbara Gilliam
*Assistant Examiner* — Gary Harris
(74) *Attorney, Agent, or Firm* — Thomas F. Roland

(57) ABSTRACT

The invention relates to a colored, multi-layered composition having a high level of Total Solar Reflectance (TSR). The composition includes a thin top, weatherable layer having a minimal amount of colored pigment suitable for optical hiding. In one embodiment a pigmented topcoat having less than 12 percent colored (non-white) pigment in a KYNAR AQUATEC emulsion (Arkema Inc.) is placed over a white elastomeric acrylic primer on a substrate to produce a colored multiplayer composition with a TSR of greater than 70%.

14 Claims, No Drawings

HIGH SOLAR REFLECTIVITY, COLORED MULTI-LAYERED COMPOSITION

FIELD OF THE INVENTION

The invention relates to a colored, multi-layered composition having a high level of Total Solar Reflectance (TSR). The composition includes a thin top, weatherable layer having a minimal amount of colored pigment suitable for optical hiding.

BACKGROUND OF THE INVENTION

Solar radiant energy absorption from the exterior surfaces of buildings is often undesirable, especially in residential and commercial buildings in warmer climates, as it decreases comfort and increases cooling costs. Instead, high solar reflectivity exterior surfaces (those with high TSR values, as measured on a 0-100% scale) are desirable in order to keep buildings cooler in the sun, and so reduce cooling and energy costs. Some areas of the country now have voluntary or involuntary standards for minimum TSR levels for new roofing materials. In some cases, these minimum TSR levels are as high as 70%, meaning that in practice it has only been possible to meet the standards by using white, or very pale colored, roofing materials. For aesthetic reasons, it would be desirable to use a variety of colors, including darker and brighter colors, in roofing materials.

Many publications about "cool roof coatings" describe the conventional wisdom that TSR properties are primarily determined by the reflective properties of the pigment(s) used in the topcoat (cf. a recent paper by M. Zheng and K. Wood, appearing in Finishing Today magazine). This paper claims that small improvements (2-3% absolute) in TSR can be obtained by using KYNAR PVDF based coatings instead of conventional resins.

Surprisingly, it has now been found that a colored topcoat, over a high TSR underlayer can be formulated to produce a high TSR, colored composition. This multi-layered composition can be used to coat roofs and walls of buildings, thus providing a variety of useful colors, while maintaining a high TSR.

SUMMARY OF THE INVENTION

The invention relates to a multi-layer composition comprising; a) a thin colored topcoat, with an L* color component value of less than 70 units on the CIELab* scale, and an inherent TSR of less than 70%; and b) a high TSR underlayer, where the TSR of the composition is greater than 50% on a 0-100% scale, and the TSR of the multi-layer composition is at least 8% (absolute) higher than the inherent TSR of the topcoat.

The invention also relates to a method of providing an exposed building surface having both a color having an L* value of less than 70 units, and a TSR value of greater than 50%.

DETAILED DESCRIPTION OF THE INVENTION

The invention relates to a high TSR, colored, multi-layer composition useful as the outer layer of a structure.

As used herein, color values are given in relation to the L* color component on the CIELab* scale, as measured at a 0/45 degree angle geometry, D65 illuminant, 10 degree observer. White, pale and pastel colors are known to have very high L* values, typically greater than 70 units. Darker colors, and saturated primary colors other than yellow, are known to have lower L* values.

The "inherent TSR" as used herein refers to the TSR of a composition at infinite thickness.

Total Solar Reflectance (TSR) values are measured according to ASTM C1549-04, and expressed as a percentage. It is generally known that high L* values will b related to higher TSR values.

Top Layer

The thin colored topcoat layer contains one or more colored pigments and a matrix. The topcoat dry film thickness is less than about 200 microns, preferably less than about 100 microns, more preferably less than about 50 microns. This topcoat has a low level of opacity in the near infrared region. Low opacity is obtained by using the minimal volume concentration of pigment in the formulation. The minimal pigment volume concentration is defined as the lowest volume concentration of pigment in the dry film which is capable of achieving the desired object color, and hiding of the underlayer color, at the specified design thickness of the topcoat (the specified design thickness, which is mathematically related to the specified coverage rate of the topcoat in liters/square meter, is established by the formulator of the paint system, taking into account various factors well known in the paint industry, such as the application method to be employed, the service life requirements of the coating, and various economic considerations). For any given formulation, the minimal pigment volume concentration will depend on the pigment grade(s) used, in addition to the specified design thickness of the topcoat. In general, pigment grades designed for higher TSR coatings ("cool roof pigments") are preferred. The pigment can be a mixture of one or more pigments. The topcoat layer has a color with an L* value of less than 70 units, preferably less than 60 units, and more preferably less than 50 units. The inherent TSR of the topcoat is less than 70%, preferably less than 60% and more preferably less than 50%.

The pigment is homogeneously dispersed in a polymeric matrix, to form the topcoat composition. The polymer matrix can be a thermoplastic or thermoset polymer compatible with the pigment. It could also be a mixture of compatible polymers, such as fluoropolymers and acrylics. Useful matrix materials include, but are not limited to acrylics, fluoropolymers, polyamides, polyolefins, polycarbonate, TPO, polyesters, polyurethanes, and mixtures thereof. Preferably the topcoat matrix is a weatherable material, such as fluoropolymer-based matrixes. In one preferred embodiment, the topcoat matrix is a polyvinylidene fluoride (PVDF) polymer or copolymer, or a blend of PVDF polymer or copolymer with an acrylic resin. Fluoropolymers are preferred not only for their weatherability, but also because it is known that a topcoat matrix of polyvinylidene fluoride (co)polymer can boost the TSR value by an additional small amount, on the order of 2-3% absolute. While not being bound by any particular theory, it is believed that the lower refractive index of PVDF (co)polymers leads to a better TSR value than polymer matrices having a higher refractive index. Useful polymers may be made by any polymerization method, including, but not limited to emulsion, solution, suspension, and reverse emulsion polymerization.

In addition to the pigment and matrix, the topcoat may also contain other adjuvants, as known in the art for use in a coating. These include, but are not limited to water or one or more solvents, coalescents, cosolvents, dispersants and surfactants, pigment extenders, flow control additives, defoamers, slip aids, UV absorbers, impact modifiers, crosslinkers, nanoparticles, and biocides. In one embodiment of the invention, the topcoat contains no titanium dioxide ($TiO_2$) or other white pigment. The topcoat may be applied as a liquid coating in one or more separate applications, as a powder coating, or as a film. Topcoat constructions involving a colored layer, covered by a clear layer, are also another embodiment of the invention.

Underlayer(s)

The topcoat is placed over at least one underlayer. Typically the underlayer is a high TSR primer layer (or basecoat)

over a substrate, though no primer layer would be needed on a high TSR substrate, in which case the substrate itself functions as the underlayer. The TSR of the underlayer(s) is greater than 50%, preferably greater than 60%, more preferably greater than 70%, and even more preferably greater than 75%.

The matrix of the primer layer or basecoat (if present) is a thermoset or thermoplastic polymeric material. Examples of useful primer layer materials include, but are not limited to, epoxy materials, polyesters, acrylics, chlorinated polyolefins, alkyds, polyurethanes, fluoropolymers, and blends of these resins. Weatherable primer layer materials such as acrylics and fluoropolymers are preferred. Typically, the primer layer is white, or very pale-colored. In one embodiment, the high TSR white color is provided by using high levels of white pigments, such as titanium dioxide, zinc oxide or barium sulfate. The primer layer thickness required to achieve a high underlayer TSR is dependent on the pigment volume concentration used, as well as the TSR level of the underlying substrate. Typically, in practice, the primer layer thickness will be determined by other performance requirements required for the coating system, as are known in the coatings industry, and the primer pigment level will be adjusted accordingly to achieve the required high underlayer TSR. The primer layer is generally at least 25 microns thick, preferably at least 100 microns thick, and more preferably at least 200 microns thick. The primer layer may be applied in one, or in several, separate coating applications.

The primer and topcoat layers may be applied in single or multiple layers to the substrate by means known in the art, including but not limited to coating by brush, roller, squeegee, foam applicator, curtain coating, vacuum coating, spraying; extrusion, powder coating, and film lamination. The TSR of the complete multi-layer composition is greater than 50%, preferably greater than 60%, and more preferably greater than 70%, while the color and L* value of the multi-layer composition is substantially the same as that of the topcoat layer, with an L* value of less than 70 units, preferably less than 60 units, and more preferably less than 50 units. By "substantially the same" is meant that the L* value is +/−5 units, and preferably +/−3 units.

The substrate layer forms a support layer of the multi-layer high TSR composition. If the TSR of the substrate layer is high enough, no primer layer may be needed. Useful substrate layers include, but are not limited to brick, stone, terra cotta, slate, concrete, cementitious materials, fiber cement, rigid and flexible polyvinyl chloride (PVC), polyurethane foam, asphalt, mineral materials, thermoplastic poly olefins (TPO), and EPDM.

The TSR of the multi-layer composition is at least 8%(absolute) higher than the inherent TSR of the topcoat, preferably at least 10% (absolute) higher, more preferably at least 15% (absolute) higher, and even more preferably at least 20% (absolute) higher.

It is possible that the topcoat color can be substantially the same as that of the substrate layer. Indeed, one advantage of the present invention is that the topcoat appearance can simulate that of the substrate—yet the multi-layer composition provides a high TSR—much higher than the substrate alone. Additionally the multi-layer composition provides other benefits, such as increased weatherability, and improved barrier properties and water resistance. In one embodiment, a terra cotta colored primer layer/topcoat can be placed over a terra cotta colored substrate such as a concrete or fiber cement rooftile. Or brick may be coated with a brick-colored composition to provide the brick-color look at a substantially higher TSR.

In one embodiment, a substrate is coated in one or several coats with a white primer based on an elastomeric acrylic resin, and containing in the dry paint film about 15-20 volume percent rutile $TiO_2$, with optionally other pigment extenders as well, the total dry film thickness of the primer being at least 200 microns (8 mils). This primer layer is coated with a colored topcoat paint based on a polyvinylidene flouride resin. An example of a useful polyvinylidene fluoride-based topcoat paint is one based primarily on the KYNAR AQUATEC RC-10206 emulsion (Arkema Inc.), and containing less than about 12 volume percent mineral oxide pigment. The pigment could be either a "cool roof" type pigment, or an iron oxide pigment. More preferably the topcoat contains less than about 6 volume percent pigment. Optimal topcoat thickness is 1-2 mils (25-50 micron) dry film thickness. In another embodiment, an acrylic latex is used in place of the KYNAR AQUATEC RC-10206 emulsion.

Another embodiment would be the use of a topcoat having a high TSR organic pigment, such as perylene black pigments, or one or more semi-transparent pigments, such as transparent iron oxide.

EXAMPLES

Example A

White Pigment Grind

The following ingredients were combined in a Cowles-type high speed disperser to a Hegmann reading of greater than 7:

| | |
|---|---|
| Water | 51.1 g |
| DISPERBYK ® 180 (Byk Chemie) | 4.7 g |
| Ammonia | 0.1 g |
| TEGOFOAMEX ® 810 (Evonik) | 0.4 g |
| TRITON ® CF-10 (Dow Chemicals) | 1.9 g |
| TIPURE ® R-960 (DuPont) ($TiO_2$) | 189 g |

Example B

Fluoropolymer Clear Coat

The following ingredients were blended with a paddle impeller:

| | |
|---|---|
| KYNAR AQUATEC ® RC-10206 fluoropolymer latex (Arkema Inc.) | 645 g |
| Dipropylene Glycol methyl ether | 47 g |
| ACRYSOL ® RM-8W (Rohm and Haas) | 16 g |
| Ammonia | 12 g |

Example C

White Basecoat Paint

The following ingredients were mixed with a paddle-type impeller:

| | |
|---|---|
| Fluoropolymer clear coat B | 707 g |
| White pigment grind A | 247 g |
| Sancure 815 (Noveon) | 230 g |
| STRODEX PK-0VOC (Dexter) | 16 g |
| BYK 346 (Byk chemie) | 4 g |

Examples D-I

Other Pigment Grinds

Other pigment grinds were prepared according to the recipe of Pigment grind A, by substituting the following pigments for the TiO2 pigment:

| | |
|---|---|
| Pigment grind D - green: | GEODE(R) V-12560 (Ferro, Inc.) |
| Pigment grind E-brown | GEODE(R) 10364 (Ferro, Inc.) |
| Pigment grind F- Brown | GEODE ® V-10117 (Ferro, Inc.) |
| Pigment grind G- teal | SHEPHERD 187B (Shepherd Color Co.) |
| Pigment grind H - red iron oxide | Iron oxide pigment RO 3097 (Rockwood) |
| Pigment grind I - red | GEODE ® V-13810 (Ferro, Inc.) |

Example J

Topcoat Resin Base

The following ingredients were mixed with a paddle-type impeller:

| | |
|---|---|
| KYNAR AQatec ® RC-10206 fluoropolymer latex (Arkema Inc.) | 1903 g |
| Dipropylene Glycol methyl ether | 137 g |
| RHOPLEX ® 2438 emulsion (Rohm and Haas) | 457 g |
| STRODEX ® PK-0VOC (Dexter, Inc.) | 46 g |
| ACRYSOL ® RM-8W (Rohm and Haas) | 10 g |
| BYK ® 346 (Byk Chemie) | 11 g |

Example J

Topcoat Recipes

The following ingredients were mixed with a paddle impeller to form topcoats K-T, as shown in Table 1:

TABLE 1

| | Topcoat: | | | | | | | | | |
|---|---|---|---|---|---|---|---|---|---|---|
| | K Red 5 PVC | L Green 3 PVC | M Brown 10 PVC | N Red 20 PVC | P Teal 5 PVC | Q Teal 25 PVC | R Red 5 PVC | S Brown 40 PVC | T Brown 5 PVC | U Brown 5 PVC |
| Topcoat base J | 200 g | 100 g | 113 g | 200 g | 100 g | 100 g | 200 g | 200 g | 200 g | |
| Pigment Grind H | 21.3 g | | | | | | | | | |
| Pigment Grind D | | 5.2 g | | | | | | | | |
| Pigment Grind E | | | | | | | | 242 g | 23.9 g | |
| Pigment Grind F | | | | | | | | | | 22 g |
| Pigment Grind G | | | | | 10.6 g | 0.8 g | | | | |
| Pigment Grind I | | | | 108 g | | | 22.8 g | | | |
| 40 PVC brown topcoat S | | | 50 g | | | | | | | |

In Table 1, PVC = Pigment volume concentration, the volume percent of pigment in the dry paint film Examples 1-13

Coated Substrates

In the follow examples 1-13, the substrates were coated with the white basecoat paint C, to an average dry film thickness of 1.2-1.5 mils. The TSR of the substrate plus basecoat was measured, then the topcoat was applied to an average dry film thickness of 1.2-1.5 mils. For each topcoat, the inherent TSR was estimated by making a topcoat at the highest practical pigment level with the same pigment grind, e.g. for Example 4, a 40% pigment volume concentration paint was prepared (40 PVC brown topcoat S) and the inherent TSR was the TSR value for that paint applied onto the same substrate, or a lower TSR substrate, at a dry film thickness of at least 1.2 mils.

In Examples 11-13, no white basecoat paint was used. The underlayer was provided by the white sand gypsum concrete alone.

| Ex. # | Substrate | TSR of underlayer | Top Coat | TSR (underlayer + topcoat) | Topcoat Inherent TSR | Increase In TSR | Thin Topcoat L* on black or grey | Final L* |
|---|---|---|---|---|---|---|---|---|
| 1 (comp) | Gray concrete tile, no basecoat | 18.2% | NONE | 18.2% | — | — | | |
| 2 | Gray concrete tile | 77.4% | K, red | 36.2% | 26.7% | 9.5% | 35.0 | 34.9 |
| 3 | Gray concrete tile | 80.1% | L, green | 46.0% | 36.4% | 9.6% | 27.1 | 30.4 |
| 4 | Gray concrete tile | 76.9% | M, brown | 38.2% | 23.8% | 14.4% | 28.6 | 29.0 |
| 5 | Gray concrete tile | 77.7% | N, red | 38.0% | 24.6% | 13.4% | 32.9 | 33.0 |
| 6 | Gray concrete tile | 77.2% | P, teal | 34.5% | 25.7% | 8.8% | 47.0 | 51.5 |
| 7 (comp) | Granulate asphalt | 8.0% | NONE | 8.0% | — | — | | |
| 8 | Granulate asphalt | 74.2% | Q, teal | 36.1% | 21.8% | 14.3% | NM | NM |
| 9 | Granulate asphalt | 63.6% | R, red | 34.7% | 24.6% | 10.1% | 32.7 | 32.1 |
| 10 (comp) | Granulate asphalt | 40.4% | L, green | 28.0% | 36.4% | −8.4% | 27.1 | 30.9 |
| 12 | White sand gypsum concrete | 62.0% | K, red | 38.6% | 26.7% | 11.9% | 35.0 | 35.0 |
| 13 | White sand gypsum concrete | 63.0% | T, brown | 38.4% | 23.8% | 14.6% | 31.6 | 34.5 |

TSR of underlayer = (substrate plus basecoat, if any)
TSR values were obtained using a D&S reflectometer according to ASTM C-1549-04.
L* values were measured according to CIELAB 10 degree/D65 illuminant using a HunterLab Lab Scan SE unit.
NM = not measured

What is claimed is:

1. An exterior building surface comprising a multilayer composition comprising:
   a) a thin topcoat layer having a dry film thickness of less than 200 microns having an L* value of less than 70 units on the CIELab* scale, and an inherent total solar reflectance value of less than 60% coated directly over at least one underlayer (b);
   b) the at least one underlayer, wherein the total solar reflectance (TSR) of the underlayer(s) together is greater than 60%, and wherein said underlayer(s) comprise a) an uncoated substrate or b) a substrate having thereon at least one primer layer, said primer layer(s) on the substrate between the substrate and the thin topcoat, said substrate is selected from is selected from the group consisting of brick, stone, terra cotta, slate, concrete, cementitious materials, fiber cement, rigid and flexible polyvinyl chloride (PVC), polyurethane foam, asphalt, mineral materials and thermoplastic poly olefins (TPO); wherein the L* value and color of the multi-layer composition is substantially the same as that of the topcoat layer, and wherein the TSR of the multilayer composition is at least 8% (absolute) higher than the inherent TSR of the topcoat, wherein said inherent total solar reflectance is the TSR of a composition at infinite thickness and is estimated by measuring the TSR of a dry film thickness of at least 1.2 mils on the same substrate, for a topcoat of the same pigment grind at a 40 percent pigment level.

2. The building surface comprising a multi-layer composition of claim 1, wherein in said coating composition the L* value of the topcoat layer is less than 60 units.

3. The building surface comprising a multi-layer composition of claim 1, wherein in said composition the L* value of the topcoat layer is less than 50 units.

4. The building surface comprising a multi-layer composition of claim 1, wherein in said composition the inherent TSR value of the topcoat layer is less than 50%.

5. The building surface comprising a multi-layer composition of claim 1, wherein in said composition the topcoat polymer matrix includes a fluoropolymer.

6. The building surface comprising a multi-layer composition of claim 1, wherein in said composition the topcoat polymer matrix comprises at least 50 weight percent polyvinylidene polymer or copolymer.

7. The building surface comprising a multi-layer composition of claim 1, wherein in said composition the TSR of the whole multi-layer composition is greater than 50%.

8. The building surface comprising a multi-layer composition of claim 1, wherein in said composition the TSR of the whole multi-layer composition is greater than 70%.

9. The building surface comprising a multi-layer composition of claim 1, comprising a topcoat layer, a primer and a substrate layer.

10. The building surface comprising a multi-layer composition of claim 9, wherein the primer layer comprises an acrylic polymer or copolymer.

11. The building surface comprising a multi-layer composition of claim 9, wherein said primer layer is at least 25 microns in thickness.

12. The building surface comprising a multi-layer composition of claim 11, wherein said primer layer is at least 100 microns in thickness.

13. The building surface comprising a multi-layer composition of claim 1, wherein the thin topcoat layer has a dry film thickness of less than 100 microns.

14. The building surface comprising a multi-layer composition of claim 1, wherein the thin topcoat layer has a dry film thickness of less than 50 microns.

* * * * *